United States Patent
Archer, Jr. et al.

(10) Patent No.: US 9,454,203 B2
(45) Date of Patent: Sep. 27, 2016

(54) METHOD, SYSTEM AND COMPUTER PROGRAM PRODUCT FOR REDUCING CONSUMPTION OF BATTERY POWER

(75) Inventors: Erick D. Archer, Jr., Frisco, TX (US); Harshal S. Chhaya, Plano, TX (US); Sara Beth Davis Seba, Highlands Ranch, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 496 days.

(21) Appl. No.: 13/407,277

(22) Filed: Feb. 28, 2012

(65) Prior Publication Data

US 2012/0284552 A1 Nov. 8, 2012

Related U.S. Application Data

(60) Provisional application No. 61/482,292, filed on May 4, 2011.

(51) Int. Cl.
*G06F 1/32* (2006.01)

(52) U.S. Cl.
CPC .................. *G06F 1/3203* (2013.01)

(58) Field of Classification Search
USPC ....... 713/1, 2, 100, 300, 310, 320, 321, 322, 713/323, 324, 330, 340, 375
See application file for complete search history.

(56) References Cited

U.S. PATENT DOCUMENTS

| | | | |
|---|---|---|---|
| 6,262,672 B1 * | 7/2001 | Brooksby et al. | 340/870.1 |
| 6,975,947 B2 * | 12/2005 | Oh | 702/60 |
| 7,598,702 B2 * | 10/2009 | Walrath | 320/107 |
| 2003/0149904 A1 * | 8/2003 | Kim | 713/330 |

* cited by examiner

*Primary Examiner* — Kim Huynh
*Assistant Examiner* — Paul J Yen
(74) *Attorney, Agent, or Firm* — Michael A. Davis, Jr.; Frank D. Cimino

(57) ABSTRACT

An information handling system is powered by a battery. In response to determining that a remaining amount of power within the battery has fallen below a first threshold, power consumption of the information handling system is reduced by reducing at least one non-critical operation of the information handling system, while maintaining at least one critical operation of the information handling system. After reducing the at least one non-critical operation, it is increased in response to determining that the remaining amount of power within the battery has risen above a second threshold.

24 Claims, 3 Drawing Sheets

METHOD, SYSTEM AND COMPUTER PROGRAM PRODUCT FOR REDUCING CONSUMPTION OF BATTERY POWER

CROSS-REFERENCE TO RELATED APPLICATIONS

This application claims priority to U.S. Provisional Patent Application Ser. No. 61/482,292, filed May 4, 2011, entitled ADAPTIVE POWER MANAGEMENT TO OPTIMIZE BATTERY LIFE, naming Erick Darnell Archer Jr. et al. as inventors, which is hereby fully incorporated herein by reference for all purposes.

BACKGROUND

The disclosures herein relate in general to information handling systems, and in particular to a method, system and computer program product for reducing consumption of battery power.

For a portable battery-powered electronics device (e.g., handheld calculator, mobile smartphone, GPS receiver, camera, or MP3 player), the device's consumption of power is an important factor. For example, if the device consumes power at a higher rate, then: (a) if the battery is not rechargeable (e.g., replaceable), the higher rate of such consumption will increase a user's cost in more frequently replacing the battery; or (b) if the battery is rechargeable, the higher rate of such consumption will increase a user's inconvenience in more frequently locating a recharging source (e.g., AC power outlet) and waiting for such recharging to occur. For lowering the device's consumption of power while the device is disconnected from a recharging source, the device may allow the user to optionally reduce: (a) the device's display screen brightness; (b) a timeout period of inactivity (by the user with the device) that causes the device to automatically further reduce (e.g., dim or turn off) the device's display screen brightness; and/or (c) the device's operating speed. Nevertheless, if the device implements such reductions irrespective of the battery's remaining amount of power, then such implementation may unnecessarily reduce efficiency and/or quality of the device's operations.

SUMMARY

An information handling system is powered by a battery. In response to determining that a remaining amount of power within the battery has fallen below a first threshold, power consumption of the information handling system is reduced by reducing at least one non-critical operation of the information handling system, while maintaining at least one critical operation of the information handling system. After reducing the at least one non-critical operation, it is increased in response to determining that the remaining amount of power within the battery has risen above a second threshold.

DETAILED DESCRIPTION

Figure 1:
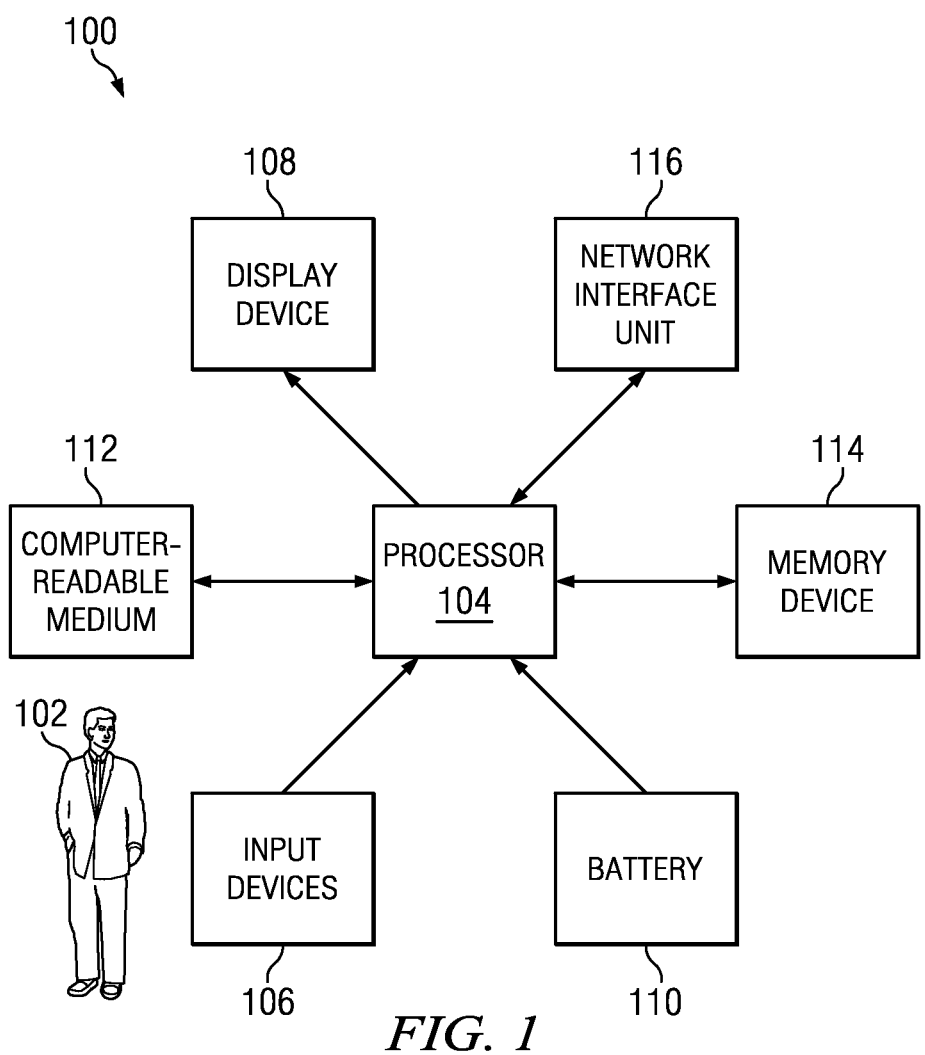
FIG. 1 is a block diagram of an information handling system, in an illustrative embodiment.

FIG. 1 is a block diagram of an information handling system, indicated generally at 100, in the illustrative embodiment. In the example of FIG. 1, the system 100 operates in association with a human user 102. The system 100 executes various processes and performs operations (e.g., processing and communicating information) in response thereto.

The system 100 includes various electronic circuitry components for performing the system 100 operations, such as: (a) a processor 104, which is a general purpose computational resource for executing and otherwise processing instructions, and for performing additional operations (e.g., communicating information) in response thereto; (b) input devices 106 for receiving information from the user 102; (c) a display device 108 (e.g., a backlit color display panel) for displaying information to the user 102; (d) a battery 110, which is a source of power for the system 100; (e) a computer-readable medium 112 (e.g., a nonvolatile memory device) for storing information; (f) a memory device 114 (e.g., a volatile random access memory ("RAM") device) for storing information; (g) a network interface unit 116 for communicating information to and from a network; and (h) various other electronic circuitry for performing other operations of the system 100. In a first embodiment, the battery 110 is rechargeable. In a second embodiment, the battery 110 is replaceable (e.g., not rechargeable).

The system 100 performs its operations in response to instructions of computer-readable software programs that are stored on the computer-readable medium 112 and executed by the processor 104. Such programs include, but are not limited to: (a) applications, such as applications for calculator, data collection, lists, statistics, graphing, geometry, querying, polling (e.g., quick polling), and other functions; (b) a window, dialog and event manager; (c) a "press to test" handler; (d) a probe input/output manager; (e) an emulator; (f) a settings manager; (g) a power manager; (h) a communication stack; (i) a display driver; (j) a keyboard driver; (k) a touchpad driver; (l) a universal serial bus ("USB") interface driver; (m) a wireless interface driver; and (n) boot code. The memory device 114 stores data that are processed by the processor 104, in response to the processor 104 executing such programs.

As shown in FIG. 1, the processor 104 is connected to the input devices 106, the display device 108, the battery 110, the computer-readable medium 112, and the memory device 114. For clarity, although FIG. 1 shows the battery 110 connected to only the processor 104, the battery 110 is further coupled to the other components of the system 100. Also, the processor 104 is coupled through the network interface unit 116 to the network (not shown in FIG. 1), such as a Transport Control Protocol/Internet Protocol ("TCP/IP") network (e.g., the Internet or an intranet). For example, the network interface unit 116 communicates information by outputting information to, and receiving information from, the processor 104 and the network, such as by transferring information (e.g. instructions, data, signals) between the processor 104 and the network (e.g., wirelessly or through a USB interface).

The user 102 operates the input devices 106 for outputting information to the processor 104, which receives such information from the input devices 106. The input devices 106 include, but are not limited to, an electronic keyboard and a pointing device (e.g., an electronic touchpad). The user 102 operates such keyboard to output alphanumeric text information to the processor 104, which receives such alphanumeric text information. The user 102 operates such pointing device to output cursor-control information to the processor 104, which receives such cursor-control information. In response to signals from the processor 104, the display device 108 displays visual images, which represent information, so that the user 102 is thereby enabled to view such visual images. In one version of the illustrative embodiment: (a) the display device 108 is a liquid crystal display ("LCD") device; and (b) the input devices 106 are embodied as touch-sensitive circuitry of such LCD device, so that the input devices 106 are integral with such LCD device.

In the illustrative embodiment, the system 100 is a portable handheld electronics device, and its various components (e.g., the input devices 106, the display device 108, the battery 110, the computer-readable medium 112, the memory device 114, and the network interface unit 116) are housed integrally with one another. In a first example, the system 100 is a graphing calculator. In a second example, the system 100 is a mobile smartphone. In a third example, the system 100 is a laptop (e.g., netbook) computer.

Figure 2:
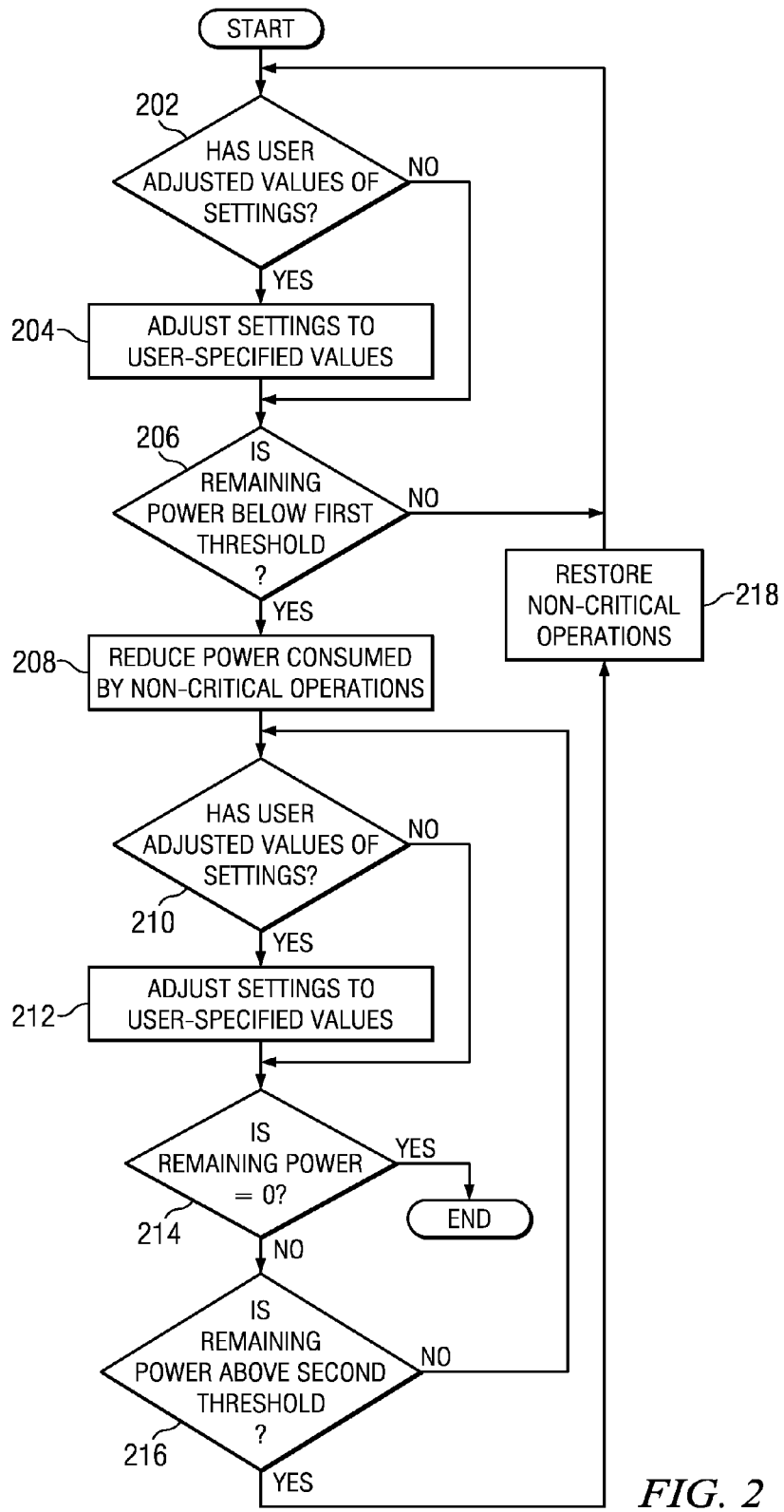
FIG. 2 is a flowchart of a first mode of operation for reducing consumption of power by the system of FIG. 1.

FIG. 2 is a flowchart of a first mode of operation for reducing consumption of power by the system 100. At a step 202 of the first mode, the processor 104 determines whether the user 102 has adjusted values of settings for reducing consumption of power by the system 100. Examples include, but are not limited to, values of settings for: (a) brightness (e.g., backlighting) of the display device 108; (b) a timeout period of inactivity (by the user 102 with the input devices 106) that causes the processor 104 to automatically output a signal for reducing brightness of the display device 108; (c) wireless communication operations of the network interface unit 116; (d) USB operations of the network interface unit 116; (e) speed of the processor 104; and/or (f) screen refresh operations of the display device 108.

In response to the processor 104 determining (at the step 202) that the user 102 has adjusted such values, the operation continues to a step 204, at which the processor 104 outputs signals for adjusting the settings to implement those user-specified values. After the step 204, or in response to the processor 104 determining (at the step 202) that the user 102 has not adjusted such values, the operation continues to a step 206. At the step 206, the processor 104 determines whether a remaining amount of power within the battery 110 has fallen below a first threshold (e.g., 25% of fully-charged power).

In response to the processor 104 determining (at the step 206) that the remaining amount of power within the battery 110 has not fallen below the first threshold, the operation returns to the step 202. Conversely, in response to the processor 104 determining (at the step 206) that the remaining amount of power within the battery 110 has fallen below the first threshold, the operation continues to a step 208, at which the processor 104 automatically outputs signals for reducing the system 100 consumption of power by reducing (e.g., suspending) at least some non-critical operations of the system 100. In that manner, the user 102 is enabled to continue using the system 100 for a longer period of time (so that the system 100 is more likely to complete its operations) before the remaining amount of power within the battery 110 falls to zero. Accordingly, the system 100 prioritizes its critical operations over its non-critical operations, so that such critical operations remain unaffected by such reduction.

In various situations, examples of non-critical operations may include the following, which can impact the system 100 consumption of power: (a) brightness, contrast setting, and/or background color of the display device 108; (b) timeout period of inactivity (by the user 102 with the input devices 106) that causes the processor 104 to automatically output a signal for reducing (e.g., dimming or turning off) brightness of the display device 108; (c) wireless communication operations of the network interface unit 116; (d) USB operations of the network interface unit 116; (e) high speed of the processor 104; (f) screen refresh operations of the display device 108; and/or (g) algorithm for retransmitting information wirelessly through the network interface unit 116 (e.g., number of retries, and data rate of retries). To reduce brightness of the display device 108, the processor 104 outputs a signal for lowering a level of such brightness (e.g., lowering the display device 108 to a smaller percentage (e.g., 0%) of its maximum brightness). Similarly, to reduce screen refresh operations of the display device 108, the processor 104 outputs a signal for lowering a rate of such refresh operations (e.g., lowering the display device 108 to a smaller percentage of its maximum refresh rate).

In a first example, the system 100 is a graphing calculator, and critical operations include (but are not limited to) high speed of the processor 104 in performing calculations and graphing functions. In the first example, the processor 104 maintains its critical high speed operation to ensure that calculations and graphing remain unaffected, even while the processor 104 automatically reduces the system 100 consumption of power by a combination of: (a) outputting a signal for suspending the non-critical wireless communication operations of the network interface unit 116; (b) outputting a signal for reducing the non-critical brightness of the display device 108; and/or (c) reducing a timeout period of inactivity (by the user 102 with the input devices 106) that causes the processor 104 to automatically output a signal for further reducing the non-critical brightness of the display device 108.

In a second example, the system 100 is a mobile smartphone, and critical operations include (but are not limited to) making and receiving wireless telephone calls. In the second example, the processor 104 maintains critical wireless communication operations of the network interface unit 116 that ensure wireless telephone calls remain unaffected, even while the processor 104 automatically reduces the system 100 consumption of power by a combination of: (a) reducing the non-critical speed of the processor 104; (b) outputting a signal for reducing the non-critical brightness of the display device 108; (c) reducing a timeout period of inactivity (by the user 102 with the input devices 106) that causes the processor 104 to automatically output a signal for further reducing the non-critical brightness of the display device 108; (d) outputting a signal for suspending non-critical global positioning system ("GPS") location operations of the network interface unit 116; and/or (e) outputting a signal for suspending non-critical local area wireless communication operations of the network interface unit 116 (e.g., local Wi-Fi operations).

In a third example, the system 100 is a laptop (e.g., netbook) computer, and critical operations include (but are not limited to) collection of information from the network through a USB port of the network interface unit 116. In the third example, the processor 104 maintains the critical USB operations of the network interface unit 116 to ensure that such collection of information remains unaffected, even while the processor 104 automatically reduces the system 100 consumption of power by outputting a signal for reducing (e.g., turning off) the non-critical brightness of the display device 108.

After the step 208, the operation continues to a step 210, at which the processor 104 determines whether the user 102 has adjusted values of settings for reducing consumption of power by the system 100. In response to the processor 104 determining (at the step 210) that the user 102 has adjusted such values, the operation continues to a step 212, at which the processor 104 outputs signals for adjusting the settings to implement those user-specified values. After the step 212, or in response to the processor 104 determining (at the step 210) that the user 102 has not adjusted such values, the operation continues to a step 214.

At the step 214, if the remaining amount of power within the battery 110 has fallen to zero, then the operation ends. Conversely, in response to the processor 104 determining (at the step 214) that the remaining amount of power within the battery 110 has not fallen to zero, the operation continues to a step 216, at which the processor 104 determines whether the remaining amount of power within the battery 110 has risen above a second threshold (e.g., 50% of fully-charged power). In the illustrative embodiment, the second threshold is higher than the first threshold.

In response to the processor 104 determining (at the step 216) that the remaining amount of power within the battery 110 has not risen above the second threshold, the operation returns to the step 210. Conversely, in response to the processor 104 determining (at the step 216) that the remaining amount of power within the battery 110 has risen above the second threshold, the operation continues to a step 218, at which the processor 104 outputs signals for automatically increasing (e.g., fully restoring or unsuspending) non-critical operations of the system 100 that were previously reduced at the step 208. After the step 218, the operation returns to the step 202.

In one version of the first mode, in response to the processor 104 determining (at the step 216) that the remaining amount of power within the battery 110 has not risen above the second threshold, the processor 104 determines whether a remaining amount of power within the battery 110 has fallen below yet a lower threshold (e.g., 10% of fully-charged power), and the following operations are performed: (a) in response to the processor 104 determining that the remaining amount of power within the battery 110 has not fallen below the lower threshold, the operation returns to the step 210; and (b) conversely, in response to the processor 104 determining that the remaining amount of power within the battery 110 has fallen below the lower threshold, the processor 104 reduces a value of the second threshold (e.g., reduces the value from 50% to 25% of fully-charged power) and automatically outputs signals for further reducing the system 100 consumption of power by further reducing (e.g., suspending) the same and/or different non-critical operations of the system 100, and the operation returns to the step 210. In that manner: (a) in response to the processor 104 determining (at the step 206) that the remaining amount of power within the battery 110 has fallen below the first threshold, the system 100 prioritizes its critical operations and a first subset of its non-critical operations over its remaining non-critical operations, so that such critical operations and such first subset of non-critical operations remain unaffected by such reduction at the step 208; and (b) in response to the processor 104 determining (after the step 216) that the remaining amount of power within the battery 110 has fallen below the lower threshold, the system 100 prioritizes its critical operations over at least a second subset of its non-critical operations (which may include none, some or all of the first subset of its non-critical operations), so that such critical operations remain unaffected by such reduction after the step 216. In such version of the first mode, in response to the processor 104 determining (at the step 216) that the remaining amount of power within the battery 110 has risen above the reduced value of the second threshold: (a) the processor 104 restores the original value of the second threshold (e.g., increases the value from 25% to 50% of fully-charged power); (b) the processor 104 outputs signals for automatically increasing (e.g., fully restoring or unsuspending) non-critical operations of the system 100 that were previously reduced after the step 216 (i.e., after the remaining amount of power within the battery 110 fell below the lower threshold); and (c) the operation returns to the step 210.

Figure 3:
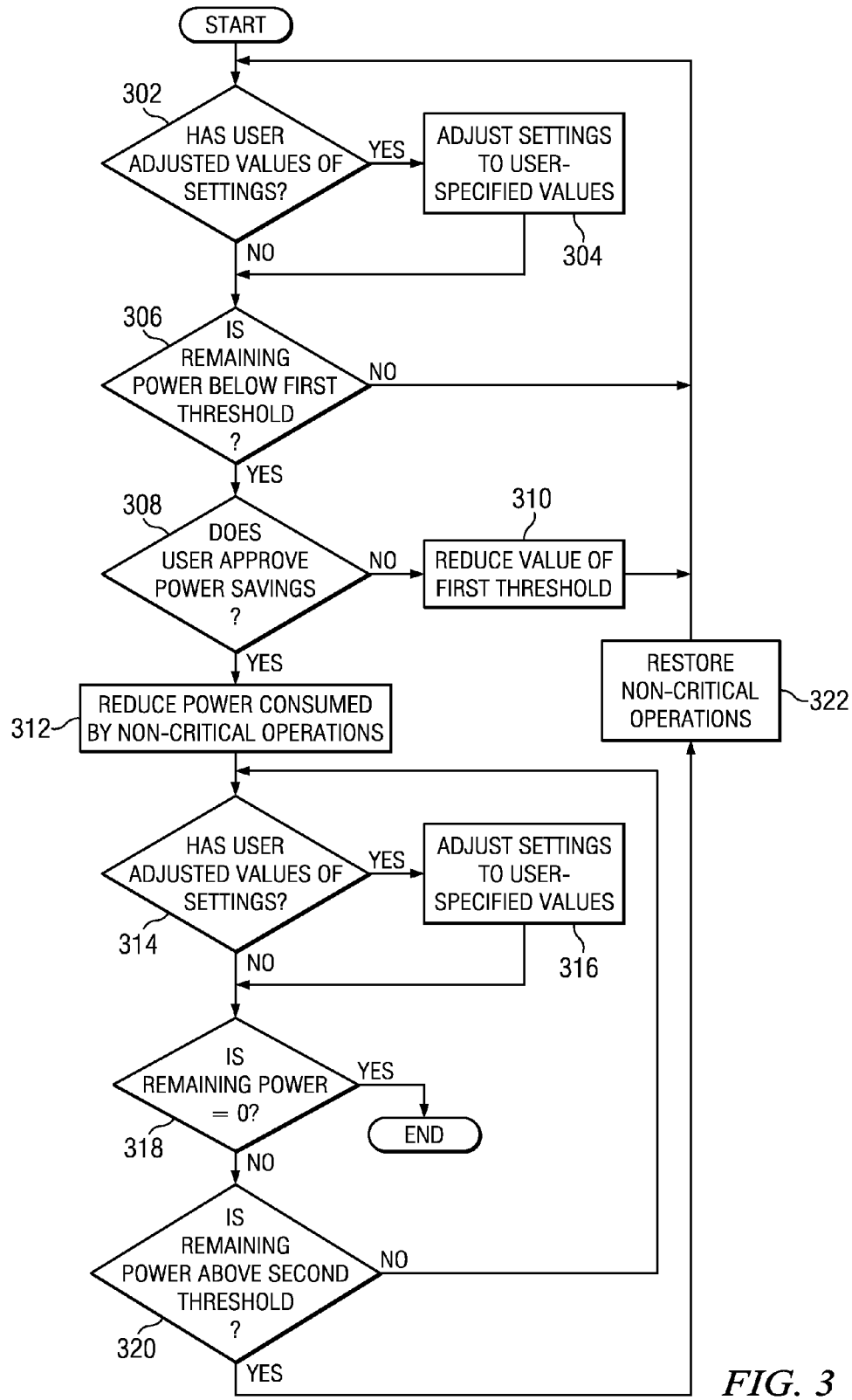
FIG. 3 is a flowchart of a second mode of operation for reducing consumption of power by the system of FIG. 1.

FIG. 3 is a flowchart of a second mode of operation for reducing consumption of power by the system 100. In one embodiment, the processor 104: (a) outputs signals for causing the display device 108 to display alphanumeric text information (e.g., a message) that describe the first and second modes of operation and that asks the user 102 to select either the first mode or the second mode; (b) implements the first mode in response to determining that the user 102 (via the input devices 106) has selected the first mode; and (c) implements the second mode in response to determining that the user 102 (via the input devices 106) has selected the second mode.

At a step 302 of the second mode, the processor 104 determines whether the user 102 has adjusted values of settings for reducing consumption of power by the system 100. In response to the processor 104 determining (at the step 302) that the user 102 has adjusted such values, the operation continues to a step 304, at which the processor 104 outputs signals for adjusting the settings to implement those user-specified values. After the step 304, or in response to the processor 104 determining (at the step 302) that the user 102 has not adjusted such values, the operation continues to a step 306.

At the step 306, the processor 104 determines whether a remaining amount of power within the battery 110 has fallen below the first threshold. In response to the processor 104 determining (at the step 306) that the remaining amount of power within the battery 110 has not fallen below the first threshold, the operation returns to the step 302. Conversely, in response to the processor 104 determining (at the step 306) that the remaining amount of power within the battery 110 has fallen below the first threshold, the operation continues to a step 308, at which the processor 104: (a) outputs signals for causing the display device 108 to display alphanumeric text information (e.g., a message) that suggests power savings and that asks whether the user 102 approves the suggested power savings; and (b) determines whether the user 102 (via the input devices 106) approves the suggested power savings. Accordingly, in the second mode of operation, the user 102 has an opportunity to review the suggested power savings, and an opportunity to approve or disapprove whether the processor 104 implements them.

In response to the processor 104 determining (at the step 308) that the user 102 disapproves the suggested power savings, the operation continues to a step 310, at which the processor 104 reduces a value of the first threshold (e.g., reduces the value from 25% to 10% of fully-charged power). After the step 310, the operation returns to the step 302. Conversely, in response to the processor 104 determining (at the step 308) that the user 102 approves the suggested power savings, the operation continues to a step 312, at which the processor 104 outputs signals for reducing the system 100 consumption of power by reducing (e.g., suspending) at least some non-critical operations of the system 100.

After the step 312, the operation continues to a step 314, at which the processor 104 determines whether the user 102 has adjusted values of settings for reducing consumption of power by the system 100. In response to the processor 104 determining (at the step 314) that the user 102 has adjusted such values, the operation continues to a step 316, at which the processor 104 outputs signals for adjusting the settings to implement those user-specified values. After the step 316, or in response to the processor 104 determining (at the step 314) that the user 102 has not adjusted such values, the operation continues to a step 318.

At the step 318, if the remaining amount of power within the battery 110 has fallen to zero, then the operation ends. Conversely, in response to the processor 104 determining (at the step 318) that the remaining amount of power within the battery 110 has not fallen to zero, the operation continues to a step 320, at which the processor 104 determines whether the remaining amount of power within the battery 110 has risen above the second threshold.

In response to the processor 104 determining (at the step 320) that the remaining amount of power within the battery 110 has not risen above the second threshold, the operation returns to the step 314. Conversely, in response to the processor 104 determining (at the step 320) that the remaining amount of power within the battery 110 has risen above the second threshold, the operation continues to a step 322, at which the processor 104 outputs signals for automatically increasing (e.g., fully restoring or unsuspending) non-critical operations of the system 100 that were previously reduced at the step 312. After the step 322, the operation returns to the step 302.

In an alternative embodiment, at the step 322, the processor 104 outputs signals for increasing (e.g., fully restoring or unsuspending) non-critical operations of the system 100 that were previously reduced at the step 312, but only after the processor 104: (a) outputs signals for causing the display device 108 to display alphanumeric text information (e.g., a message) that suggests increasing such non-critical operations and that asks whether the user 102 approves the suggested increase; and (b) determines that the user 102 (via the input devices 106) approves the suggested increase. In such alternative embodiment, in response to the processor 104 determining (at the step 322) that the user 102 disapproves the suggested increase, the operation returns to the step 302 without performance of the suggested increase.

In one version of the second mode, in response to the processor 104 determining (at the step 320) that the remaining amount of power within the battery 110 has not risen above the second threshold, the processor 104 determines whether a remaining amount of power within the battery 110 has fallen below yet a lower threshold (e.g., 10% of fully-charged power), and the following operations are performed: (a) in response to the processor 104 determining that the remaining amount of power within the battery 110 has not fallen below the lower threshold, the operation returns to the step 314; and (b) conversely, in response to the processor 104 determining that the remaining amount of power within the battery 110 has fallen below the lower threshold, the processor 104 reduces a value of the second threshold (e.g., reduces the value from 50% to 25% of fully-charged power) and automatically outputs signals for further reducing the system 100 consumption of power by further reducing (e.g., suspending) the same and/or different non-critical operations of the system 100 (but only if such reductions are approved by the user 102), and the operation returns to the step 314. In that manner: (a) in response to the processor 104 determining (at the step 306) that the remaining amount of power within the battery 110 has fallen below the first threshold, the system 100 prioritizes its critical operations and a first subset of its non-critical operations over its remaining non-critical operations, so that such critical operations and such first subset of non-critical operations remain unaffected by such reduction at the step 312; and (b) in response to the processor 104 determining (after the step 320) that the remaining amount of power within the battery 110 has fallen below the lower threshold, the system 100 prioritizes its critical operations over at least a second subset of its non-critical operations (which may include none, some or all of the first subset of its non-critical operations), so that such critical operations remain unaffected by such reduction after the step 320. In such version of the second mode, in response to the processor 104 determining (at the step 320) that the remaining amount of power within the battery 110 has risen above the reduced value of the second threshold: (a) the processor 104 restores the original value of the second threshold (e.g., increases the value from 25% to 50% of fully-charged power); (b) the processor 104 outputs signals for automatically increasing (e.g., fully restoring or unsuspending) non-critical operations of the system 100 that were previously reduced after the step 320 (but, in an alternative embodiment, only if such increase is approved by the user 102); and (c) the operation returns to the step 314.

In one embodiment, the processor 104 performs the operations of FIG. 2 or FIG. 3 in response to a profile, so that configuration by the user 102 is unnecessary. Such profile specifies: (a) whether the processor 104 should implement the first mode of operation (FIG. 2) or the second mode of operation (FIG. 3); (b) the various thresholds (e.g., the first and second thresholds, the lower threshold, and the reduced value of the second threshold, which are discussed hereinabove); (c) which operations of the system 100 are critical operations in various situations (e.g., in the first, second and third examples, which are discussed hereinabove); (d) which operations of the system 100 are non-critical operations for the processor 104 to reduce in response to the remaining amount of power within the battery 110 falling below the various thresholds (e.g., the first and lower thresholds, which are discussed hereinabove); (e) whether the processor 104 (at the step 322) should automatically increase (e.g., fully restore or unsuspend) non-critical operations of the system 100 that were previously reduced, or instead whether the processor 104 should do so only if such increase is approved by the user 102; (f) a timeout period of inactivity (by the user 102 with the input devices 106) that causes the processor 104 to automatically output a signal for reducing brightness of the display device 108; and (g) amounts of such reductions. Optionally, the processor 104: (a) outputs signals for causing the display device 108 to display alphanumeric text information (e.g., a message) that invites the user 102 to revise the profile; (b) receives such revision from the user 102 (via the input devices 106); and (c) implements such revision.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., Java, Smalltalk, and C++); a conventional procedural programming language (e.g., C); and/or any suitable combination thereof. In a first situation, the computer-readable medium is a computer-readable storage medium. In a second situation, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for reducing power consumption of the information handling system, wherein the information handling system is powered by a battery, the method comprising:
    determining whether a remaining amount of power within the battery has fallen below a first threshold;
    in response to determining that the remaining amount of power within the battery has fallen below the first threshold, reducing the power consumption of the information handling system by suspending at least one first non-critical operation of the information handling system, while maintaining at least one critical operation of the information handling system;
    determining whether the remaining amount of power within the battery has fallen below a second threshold that is lower than the first threshold;
    in response to determining that the remaining amount of power within the battery has fallen below the second threshold, reducing the power consumption of the information handling system by suspending at least one second non-critical operation of the information handling system, while maintaining the at least one critical operation;
    unsuspending the at least one second non-critical operation in response to determining that the remaining amount of power within the battery has risen above a third threshold, wherein the third threshold is higher than the second threshold; and
    unsuspending the at least one first non-critical operation in response to determining that the remaining amount of power within the battery has risen above a fourth threshold, wherein the fourth threshold is higher than the first threshold and higher than the third threshold;
    wherein, for at least one of the first and second non-critical operations, the suspending includes: determining whether a user approves the suspending; and automatically performing the suspending, but only in response to determining that the user approves the suspending.

2. The method of claim 1, wherein the at least one critical operation includes at least one of: speed of the information handling system in performing calculations; wireless communication; and collection of information from a network.

3. The method of claim 1, wherein the at least one non-critical operation includes at least one of: brightness of a display device; a timeout period of inactivity that causes the information handling system to automatically reduce the brightness of the display device; wireless communication; and speed of the information handling system in performing calculations.

4. A system powered by a battery, the system comprising:
    a processor for: determining whether a remaining amount of power within the battery has fallen below a first threshold; in response to determining that the remaining amount of power within the battery has fallen below the first threshold, reducing power consumption of the system by suspending at least one first non-critical operation of the system, while maintaining at least one critical operation of the system; determining whether the remaining amount of power within the battery has fallen below a second threshold that is lower than the first threshold; in response to determining that the remaining amount of power within the battery has fallen below the second threshold, reducing the power consumption of the system by suspending at least one second non-critical operation of the system, while maintaining the at least one critical operation; unsuspending the at least one second non-critical operation in response to determining that the remaining amount of power within the battery has risen above a third threshold, wherein the third threshold is higher than the second threshold; and unsuspending the at least one first non-critical operation in response to determining that the remaining amount of power within the battery has risen above a fourth threshold, wherein the fourth threshold is higher than the first threshold and higher than the third threshold;
    wherein for at least one of the first and second non-critical operations, the suspending includes: determining whether a user approves the suspending; and automatically performing the suspending, but only in response to determining that the user approves the suspending.

5. The system of claim 4, wherein the at least one critical operation includes at least one of: speed of the system in performing calculations; wireless communication; and collection of information from a network.

6. The system of claim 4, wherein the at least one non-critical operation includes at least one of: brightness of a display device; a timeout period of inactivity that causes the system to automatically reduce the brightness of the display device; wireless communication; and speed of the system in performing calculations.

7. A non-transitory computer-readable medium storing instructions that are processable by a battery-powered instruction execution apparatus for causing the apparatus to perform operations comprising: determining whether a remaining amount of power within the battery has fallen below a first threshold; in response to determining that the remaining amount of power within the battery has fallen below the first threshold, reducing power consumption of the apparatus by suspending at least one first non-critical operation of the apparatus, while maintaining at least one critical operation of the apparatus; determining whether the remaining amount of power within the battery has fallen below a second threshold that is lower than the first threshold; in response to determining that the remaining amount of power within the battery has fallen below the second threshold, reducing the power consumption of the apparatus by suspending at least one second non-critical operation of the apparatus, while maintaining the at least one critical operation; unsuspending the at least one second non-critical operation in response to determining that the remaining amount of power within the battery has risen above a third threshold, wherein the third threshold is higher than the second threshold; and unsuspending the at least one first non-critical operation in response to determining that the remaining amount of power within the battery has risen above a fourth threshold, wherein the fourth threshold is higher than the first threshold and higher than the third threshold;

wherein for at least one of the first and second non-critical operations, the suspending includes: determining whether a user approves the suspending; and automatically performing the suspending, but only in response to determining that the user approves the suspending.

8. The computer-readable medium of claim 7, wherein the at least one critical operation includes at least one of: speed of the apparatus in performing calculations; wireless communication; and collection of information from a network.

9. The computer-readable medium of claim 7, wherein the at least one non-critical operation includes at least one of: brightness of a display device; a timeout period of inactivity that causes the apparatus to automatically reduce the brightness of the display device; wireless communication; and speed of the apparatus in performing calculations.

10. The method of claim 1, wherein determining whether the remaining amount of power within the battery has fallen below the second threshold includes: in response to determining that the user disapproves the suspending of the at least one first non-critical operation, determining whether the remaining amount of power within the battery has fallen below the second threshold.

11. The method of claim 1, wherein, for at least one of the first and second non-critical operations, the unsuspending includes: determining whether the user approves the unsuspending; and automatically performing the unsuspending, but only in response to determining that the user approves the unsuspending.

12. The method of claim 1, wherein, for the at least one first non-critical operation, and for the at least one second non-critical operation, the suspending includes: determining whether the user approves the suspending; and automatically performing the suspending, but only in response to determining that the user approves the suspending.

13. The method of claim 12, wherein, for the at least one first non-critical operation, and for the at least one second non-critical operation, the unsuspending includes: determining whether the user approves the unsuspending; and automatically performing the unsuspending, but only in response to determining that the user approves the unsuspending.

14. The method of claim 1, wherein the at least one second non-critical operation includes the at least one first non-critical operation.

15. The system of claim 4, wherein determining whether the remaining amount of power within the battery has fallen below the second threshold includes: in response to determining that the user disapproves the suspending of the at least one first non-critical operation, determining whether the remaining amount of power within the battery has fallen below the second threshold.

16. The system of claim 4, wherein, for at least one of the first and second non-critical operations, the unsuspending includes: determining whether the user approves the unsuspending; and automatically performing the unsuspending, but only in response to determining that the user approves the unsuspending.

17. The system of claim 4, wherein, for the at least one first non-critical operation, and for the at least one second non-critical operation, the suspending includes: determining whether the user approves the suspending; and automatically performing the suspending, but only in response to determining that the user approves the suspending.

18. The system of claim 17, wherein, for the at least one first non-critical operation, and for the at least one second non-critical operation, the unsuspending includes: determining whether the user approves the unsuspending; and automatically performing the unsuspending, but only in response to determining that the user approves the unsuspending.

19. The system of claim 4, wherein the at least one second non-critical operation includes the at least one first non-critical operation.

20. The computer-readable medium of claim 7, wherein determining whether the remaining amount of power within the battery has fallen below the second threshold includes: in response to determining that the user disapproves the suspending of the at least one first non-critical operation, determining whether the remaining amount of power within the battery has fallen below the second threshold.

21. The computer-readable medium of claim 7, wherein, for at least one of the first and second non-critical operations, the unsuspending includes: determining whether the user approves the unsuspending; and automatically performing the unsuspending, but only in response to determining that the user approves the unsuspending.

22. The computer-readable medium of claim 7, wherein, for the at least one first non-critical operation, and for the at least one second non-critical operation, the suspending includes: determining whether the user approves the suspending; and automatically performing the suspending, but only in response to determining that the user approves the suspending.

23. The computer-readable medium of claim 22, wherein, for the at least one first non-critical operation, and for the at least one second non-critical operation, the unsuspending includes: determining whether the user approves the unsuspending; and automatically performing the unsuspending, but only in response to determining that the user approves the unsuspending.

24. The computer-readable medium of claim 7, wherein the at least one second non-critical operation includes the at least one first non-critical operation.

* * * * *